United States Patent [19]

Branco et al.

[11] Patent Number: 5,630,161

[45] Date of Patent: May 13, 1997

[54] SERIAL-PARALLEL DIGITAL SIGNAL PROCESSOR

[75] Inventors: Richard G. Branco, Westmont; Edward J. Monastra, Voorhees, both of N.J.; David J. Ovadia, New York, N.Y.

[73] Assignee: Martin Marietta Corp., Moorestown, N.J.

[21] Appl. No.: 428,817

[22] Filed: Apr. 24, 1995

[51] Int. Cl.⁶ ................................................. G06F 15/16
[52] U.S. Cl. ........................ 395/800; 364/DIG. 1; 364/231.9; 364/229.41; 364/231.8
[58] Field of Search ................................... 395/800, 375, 395/159, 650, 250; 342/451, 341

[56] References Cited

U.S. PATENT DOCUMENTS

| | | | |
|---|---|---|---|
| 4,591,981 | 5/1986 | Kassabov | 395/800 |
| 4,967,340 | 10/1990 | Dawes | 364/200 |
| 5,010,477 | 4/1991 | Omoda et al. | 364/200 |
| 5,361,367 | 11/1994 | Fijany et al. | 395/800 |
| 5,392,446 | 2/1995 | Tower et al. | 395/800 |
| 5,418,915 | 5/1995 | Matuda et al. | 395/800 |
| 5,448,245 | 9/1995 | Takase | 342/195 |

FOREIGN PATENT DOCUMENTS

| | | | |
|---|---|---|---|
| 0293700 | 7/1988 | European Pat. Off. | G06F 15/06 |
| 0315529 | 5/1989 | European Pat. Off. | G06F 15/06 |
| 0478128 | 4/1992 | European Pat. Off. | G06F 15/332 |
| 0517013 | 12/1992 | European Pat. Off. | G06F 9/38 |
| 0607988 | 7/1994 | European Pat. Off. | G06F 15/78 |
| 9118342 | 11/1991 | WIPO | G06F 9/24 |

*Primary Examiner*—Larry D. Donaghue
*Attorney, Agent, or Firm*—W. H. Meise; C. A. Nieves; S. A. Young

[57] ABSTRACT

A digital signal processor (24) includes a plurality of vector processors (212x), each of which is made up of a group of, for example, six signal processors (214x). Each signal processor includes Local 1 and Local 2 ports (201, 203), and the Local 1 port of one processor of a group is coupled by a path (218) to the Local 2 port of another processor, so the group forms a ring. Each signal processor (214) also includes a memory (234), an arithmetic processor (232), and a switcher (230) for making internal interconnections among the ports, and also includes a switcher control (364, 366). At least one of the signal processors (214) of each group is of a type including a further external port (206), by which data can be coupled by a path (105) to and from the group. The signal processors of each group can be interconnected for serial or parallel processing, all under the control of a group controller (216) associated with each vector processor.

3 Claims, 6 Drawing Sheets

| PORT SELECTION CONTROL TABLE | | | | | |
|---|---|---|---|---|---|
| OPERATING MODE | PORT 1 CONTROL 354 | PORT 2 CONTROL 356 | PORT 3 CONTROL 358 | PORT 4 CONTROL 360 | PORT 6 CONTROL 362 |
| FIRST MODE DIRECTION 1 | DISABLE 334 | SELECT 320 ENABLE 344 | DISBABLE 346 | SELECT 324 | DISABLE 340 |
| FIRST MODE DIRECTION 2 | DISABLE 334 | SELECT 320 ENABLE 344 | DISABLE 346 | SELECT 322 | DISABLE 340 |
| SECOND MODE DIRECTION 1 | DISABLE 334 | DISABLE 344 | SELECT 320 ENABLE 346 | SELECT 324 | DISABLE 340 |
| SECOND MODE DIRECTION 2 | SELECT 320 ENABLE 334 | DISABLE 344 | DISABLE 346 | SELECT 322 | DISABLE 340 |
| THIRD MODE | DISABLE 334 | SELECT 320 ENABLE 344 | DISABLE 346 | SELECT 318 | DISABLE 340 |
| FOURTH MODE DIRECTION 1 | SELECT 320 ENABLE 334 | DISABLE 344 | SELECT 320 ENABLE 346 | SELECT 318 | DISABLE 340 |
| FOURTH MODE DIRECTION 2 | DISABLE 334 | DISABLE 344 | ENABLE 346 | | DISABLE 340 |
| FIFTH MODE DIRECTION 1 | DISABLE 334 | SELECT 317 ENABLE 344 | DISABLE 346 | | DISABLE 340 |
| FIFTH MODE DIRECTION 2 | DISABLE 334 | DISABLE 344 | DISABLE 346 | | ENABLE 340 |

FIGURE 4

SERIAL-PARALLEL DIGITAL SIGNAL PROCESSOR

FIELD OF THE INVENTION

This invention relates to electronic signal processors, and particularly to such processors especially suited for both serial and parallel signal processing, as occurs, for example, in radar signal processing.

BACKGROUND OF THE INVENTION

In radar signal processing, various computations must be performed on large amounts of data in order to produce the desired processed signals representative of the environment of the radar system. In many cases, the results of a first computation must be available before a second computation can begin. It is impractical to make hardware connections of a sufficient number of signal processors to perform all the desired computations simultaneously, or in a pipeline, as hundreds or thousands of interconnected processors might be required. Consequently, digital signal processing for radar systems has relied on a few fast processors, which perform the many computations in a time-sequential or hierarchical manner.

The design of such digital signal processors for high throughput, high operating speed, and proper operation is one which admits of many possible solutions. An improved radar signal processor is desired.

SUMMARY OF THE INVENTION

A digital signal processor configurable for either serial or parallel operation on source data from a source I/O port, for performing digital signal processing to produce processed signals, and for coupling the processed signals to the source I/O port, includes a plurality of first signal processing arrangements. Each signal processing arrangement includes at least three switching arrangements which may be commanded in various operating modes for coupling signals among three memories and three processors, configuring the processors for serial pipeline or parallel modes. In a particular embodiment of the invention, each of the first signal processing arrangements includes;

a plurality of first signal processors, each of the first signal processors including;
(a) a memory including at least a data input-output port, for temporarily storing data applied to the input-output port of the memory, and for reading stored data to the input-output port of the memory;
(b) an arithmetic processor including at least a data input port, a data output port, and a control port, for performing mathematical processes on input data under the control of commands applied to the control port, and for generating processed data at the output port of the arithmetic processor;
(c) a switcher including at least a command input port and first, second, and third bidirectional input-output ports, a fourth output-only port, and a fifth input-only port, the second input-output port being coupled to the data port of the memory, the fourth output port and the fifth input port being coupled to the input and output ports, respectively, of the arithmetic processor,
for, in a first mode of operation, coupling signals from the first input-output port of the switcher to the fourth output port of the switcher, for thereby coupling signals between the first input-output port of the switcher and the arithmetic processor, and coupling signals from the fifth input port of the switcher to the second input-output port of the switcher, for thereby coupling signals from the arithmetic processor to the memory,
for, in a second mode of operation, coupling signals from the first input-output port of the switcher to the fourth output port of the switcher, for thereby coupling signals from the first input-output port of the switcher to the input port of the arithmetic processor, and for coupling signals from the fifth input port of the switcher to the third input-output port of the switcher, thereby coupling signals from the output port of the arithmetic processor to the third input-output port of the switcher,
for, in a third mode of operation, coupling signals from the second input-output port of the switcher to the fourth output port of the switcher, and from the fifth input port of the switcher to the second input-output port of the switcher, thereby coupling signals from the memory to the input port of the arithmetic processor, and from the output port of the arithmetic processor to the memory,
for, in a fourth mode of operation, coupling signals from the second input-output port of the switcher to the fourth output port of the switcher, thereby coupling the memory to the input port of the arithmetic processor, and for coupling the fifth input port of the switcher to the third input-output port of the switcher, thereby coupling the output port of the arithmetic processor to the third input-output port of the switcher;

a plurality of second signal processors, each of the second signal processors including;
(a) memory including at least a data input-output port, for temporarily storing data applied to the input-output port of the memory, and for reading stored data to the input-output port of the memory;
(b) an arithmetic processor including at least a data input port, a data output port, and a control port, for performing mathematical processes on input data under the control of commands applied to the control port of the arithmetic processor, and for generating processed data at the output port of the arithmetic processor;
(c) a switcher including at least a command input port and first, second, and third bidirectional input-output ports, a fourth output-only port, a fifth input-only port, and a sixth input-output port, the second input-output port being coupled to the data port of the memory, the fourth output port and the fifth input port being coupled to the input and output ports, respectively, of the arithmetic processor,
for, in a first mode of operation, coupling signals from the first input-output port of the switcher to the fourth output port of the switcher, for thereby coupling signals between the first input-output port of the switcher and the input port of the arithmetic processor, and coupling signals from the fifth input port of the switcher to the second input-output port of the switcher, for thereby coupling signals from the output port of the arithmetic processor to the memory,
for, in a second mode of operation, coupling signals from the first input-output port of the switcher to the fourth output port of the switcher, for thereby coupling signals from the first input-output port of the switcher to the input port of the arithmetic processor, and for coupling signals from the fifth input port of the switcher to the third input-output port of the switcher, thereby coupling signals from the output port of the arithmetic processor to the third input-output port of the switcher, for, in a third mode of operation, coupling signals from the second input-output port of the switcher to the fourth output port of the switcher, and from the fifth input port of the switcher to the second input-output port of the switcher, thereby coupling signals from the memory to the input port of the arithmetic processor, and from the output port of the arithmetic processor to the memory, for, in a fourth mode of operation, coupling signals from the second input-output port of the switcher to the fourth output port of the switcher, thereby coupling the memory to the input port of the arithmetic processor, and for coupling signals from the fifth input port of the switcher to the third input-output port of the switcher, thereby coupling the output port of the arithmetic processor to the third input-output port of the switcher;

for, in a fifth mode of operation, coupling signals between the sixth input-output port of the switcher and the second input-output port of the switcher, for thereby transducing signals between the memory and the sixth input-output port;

a group local interconnection arrangement for coupling together the signal processors of a group of the signal processors, each of the group of signal processors including a plurality of the first signal processors and at least one of the second signal processors, the group local interconnection arrangement connecting the first input-output port of each of the signal processors of the group to the third input-output port of another signal processor of the group, whereby the signal processors of each of the groups are coupled in a ring;

a system interconnection arrangement coupled to the source I/O port and to the sixth input-output ports of the second signal processor(s) of each of the groups of signal processors;

a plurality of group controllers, each of which is associated with one of the groups of signal processors, each of the group controllers being coupled to the arithmetic processor and to the switcher of each of the signal processors of the associated group of signal processors, for selecting, for each one of the switchers of the signal processors, at least one of the first, second, third, and fourth modes of operation in the case of a first signal processor, and one of the first, second, third, fourth, and fifth modes of operation in the case of the second signal processor, independently of the mode of operation selected for any other of the switchers of the signal processors, and for selecting the mathematical operations to be performed by each of the arithmetic processors of the signal processors, independently of the mathematical operations selected to be performed for any others of the arithmetic processors of the signal processors, all under the control of stored instructions associated with the group controller, which stored instructions are selected by command external to the group controller, the stored instructions causing the group controller to (a) when data is to coupled between the source I/O port and the memory of a second signal processor of the group, select the fifth mode of operation;

(b) in a serial processing mode, select the fourth mode of operation for at least one of the second signal processors, and the second mode of operation for at least one of the first signal processors next adjacent to the second signal processor in the ring, and the fourth mode of operation for at least one of the first signal processors more remote from the second signal processor than the next adjacent first signal processor;

(c) in a parallel processing mode, select the third mode of operation for all the first and second signal processors.

A processor according to the invention has at least three signal processors in each of the groups of signal processors, and a particular embodiment of the invention has six signal processors in each of the groups of signal processors.

DESCRIPTION OF THE DRAWING

FIG. 2b is a simplified block diagram of one of the signal processors of a vector processor of the arrangement of FIGURE 2a;

FIG. 4 is a simplified tabular representation of connections which are made in each of several operating modes in the switching arrangement of FIG. 3.

DESCRIPTION OF THE INVENTION

Figure 1:
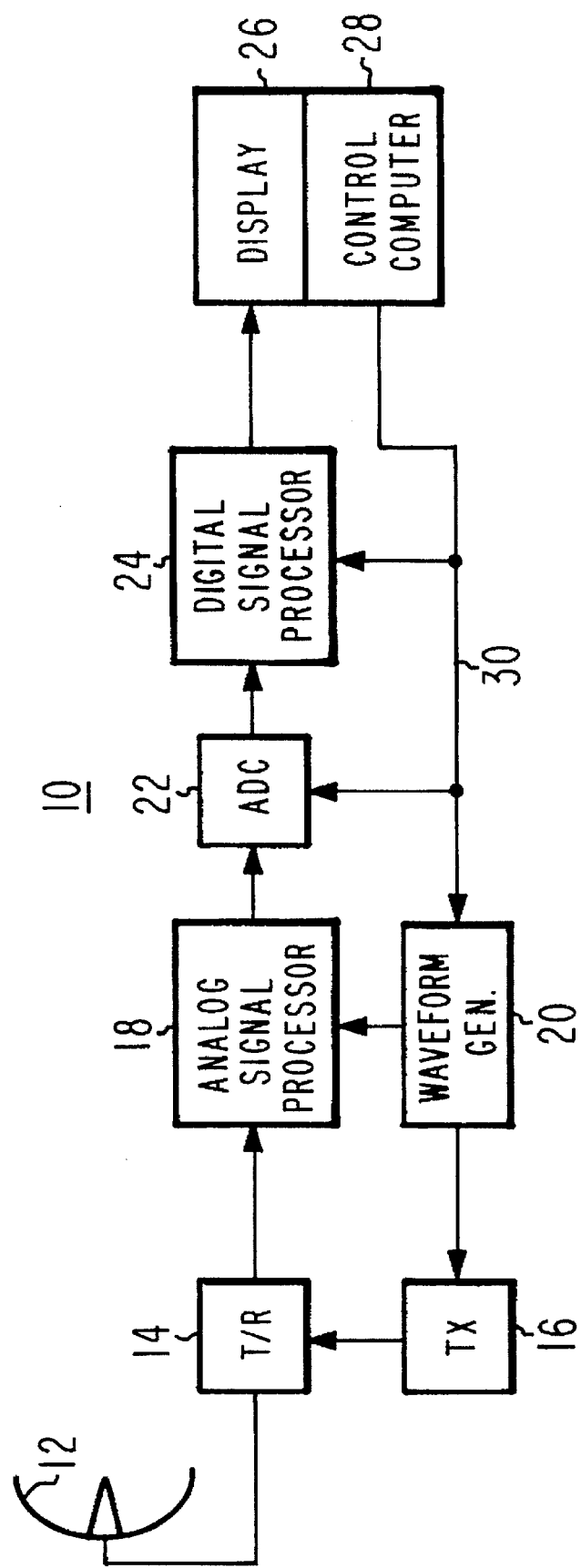
FIG. 1 is a simplified block diagram of a radar system, in which a digital signal processor according to the invention may be used.

FIG. 1 is a simplified block diagram of a radar system in which the invention may be used. In FIG. 1, a radar system 10 includes an antenna 12, which is coupled by way of a transmit-receive (T/R) module 14 to a transmitter 16 and an analog signal processor 18. Analog signal processor 18 may include low-noise amplifiers, frequency converters, demodulators, and the like, all as known in the art. A waveform generator 20 is coupled to both the transmitter 16 and to waveform generator 18 to control the bandwidth and aid in modulation and demodulation. The analog signal at the output of analog signal processor 18 is applied to an analog-to-digital converter (ADC) 22, which converts the signals to digital form. The digital signals from DAC 22 are applied to a digital signal processor 24, which performs various processing, most of which can be described by mathematical functions such as fast Fourier transform (FFT), constant false-alarm rate (CFAR), finite-impulse response (FIR) filtering, as well as matrix addition, multiplication and the like. The processed digital signals are applied from digital signal processor 24 to an operator display 26. Operator display 26 is adjacent an operator control console 28, which interacts with other portions of the system, as suggested by signal paths 30, to form an operable system.

Figure 2A:
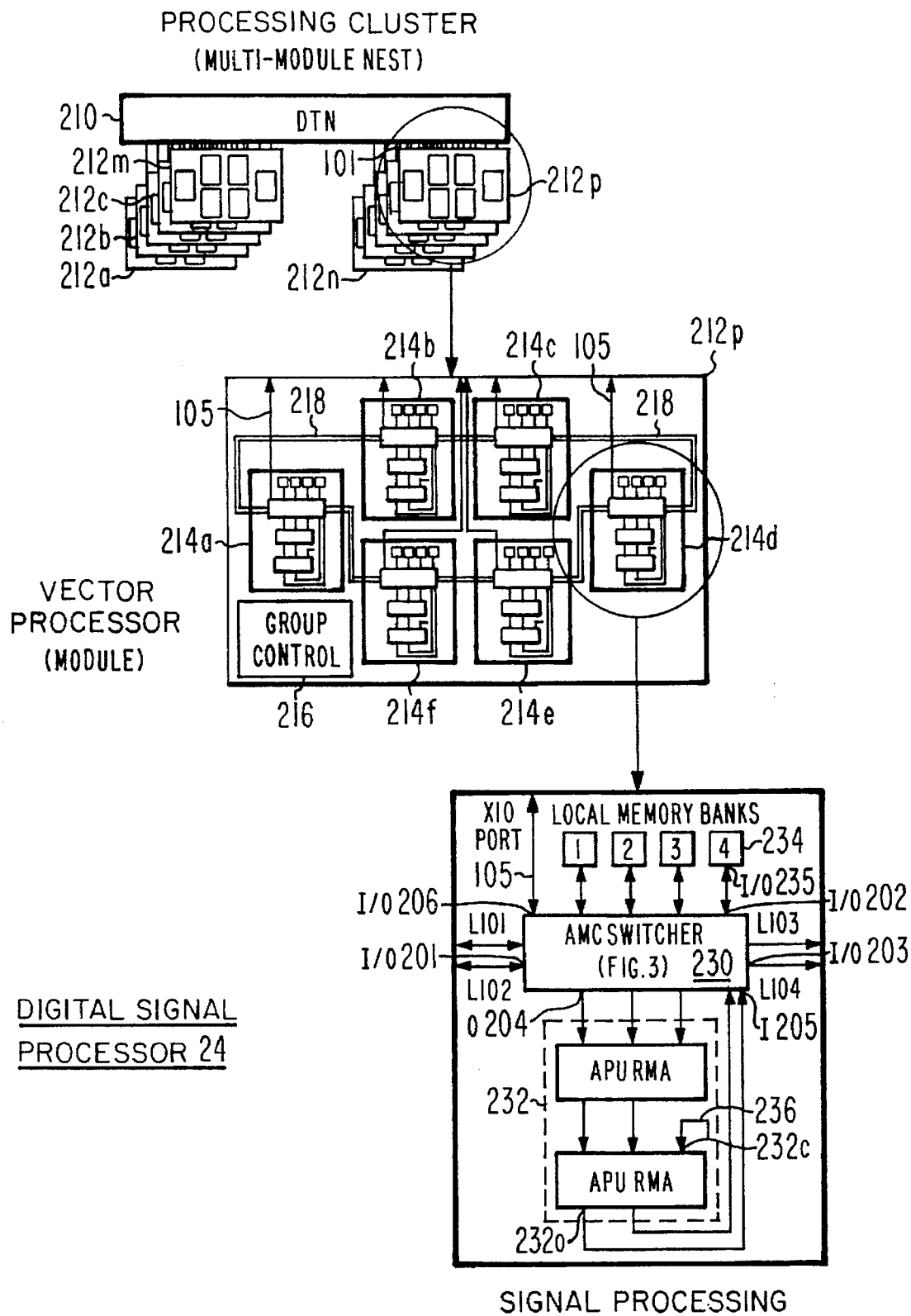
FIG. 2a is a simplified schematic block diagram of the architecture of a portion of the digital signal processor of the arrangement of FIG. 1, including a plurality of vector processors, each of which vector processors includes a plurality of signal processors, each of which signal processors includes memory, a switcher, and an arithmetic processing unit in accordance with the invention.

FIG. 2a illustrates portions of digital signal processor 24 of FIG. 1. In FIG. 2a, signal processor 24 includes a data transfer network (DTN) 210, which controllably interconnects a plurality of vector processor modules 212a, 212b, 212c, ... 212m, 212m, ... 212p, and also provides some ancillary memory (not separately illustrated) to aid in the processing. Each vector processor module 212x (where "x" represents any one of letters a–p, and the hyphen represents the word "through") includes a group of signal processors 214$_x$. For example, vector processor module 212p is illustrated as including a group of six signal processors 214a, 214b, 214c, 214d, 214e, and 214f. Six signal processors 214x per vector processor module 212x was deemed to be a manageable number, but other group sizes may be used. In particular, three processors is believed to be the minimum number which can be used in accordance with the invention. Each vector processor module 212x, in addition to a group of signal processors 214$_x$, also includes a group controller, described in more detail below. Vector processor module 212p is illustrated in FIG. 2a as including a group controller 216. Signals are coupled to and from at least some of the individual signal processors 214$_x$ of each vector processor 212$_x$, as described in more detail below, by signal paths designated 105.

Figure 2B:
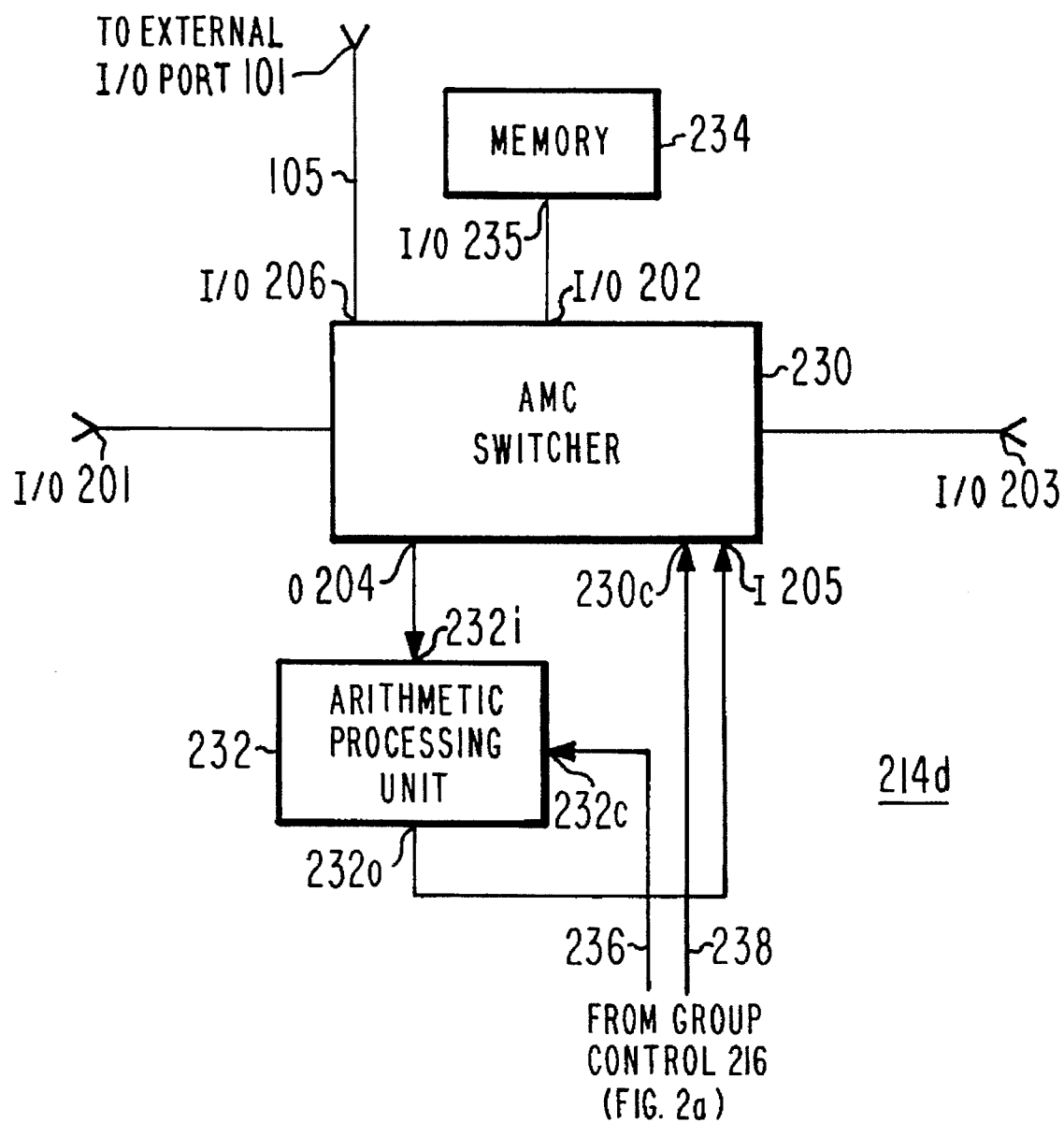

FIGS. 2a and 2b illustrate some details of signal processor 214d. In FIGS. 2a and 2b, signal processor 214d includes a "Local 1" or first input-output (I/O) port 201 coupled to a array memory controller 230, which is no more than a controlled routing switch. A second input-output port 202 of switch 230 is connected to an I/O port 235 of a memory 234, and a further "Local 2" or third input-output port 203 allows signal processor 214d to be connected to the first or Local 1 input port of another signal processor 214$_x$ of vector processor 212p. A fourth, output-only port 204 of switcher 230 is connected to the input port 232i of an arithmetic processing unit 232, and the output port 232o of arithmetic processing unit 232 is coupled to a fifth, input-only port 205 of switcher 230.

As suggested in FIG. 2a, vector processor 212p includes connections, some of which are designated 218, which connect the first or Local 1 I/O port 201 of one signal processing unit or signal processor 214x of the group to the third or Local 2 I/O port 203 of another signal processor of the group, so that the "local" ports of the signal processor 214x of the group are interconnected in a "ring," by which each signal processor 214x of a group of such signal processors within a vector processor 212x can communicate with other signal processors 214x of the group.

In addition to the five ports 201, 202, 203, 204, and 205 described above in conjunction with each signal processor 214x of FIGS. 2a and 2b, at least some of the signal processors 214 of each vector processor 212 of FIG. 2a, including vector processor 212p, are of a second type, which second type includes an additional "external" input-output port, which can be connected, if desired, to system signal paths 105, for communication with the digital signal processor 24. For example, signal processor 214d of vector processor 212p includes a sixth input-output port 206, which is used to couple unprocessed data from the system as a whole into the signal processors 214a–214f of a group of signal processors associated with vector processor 212p, and to carry away the processed output signals. In theory, only one of the signal processors 214 of a vector processor 212 requires the "external" sixth input-output port 206, because the input data can be distributed to (or collected from) other signal processors of the group during later (earlier) clock cycles than those during which the data transfer to (from) the signal processor takes place, but it may be desirable to have more than one of the second type of signal processors 214, each of which includes a sixth input-output port 206, in each group of signal processors, to allow signals from outside the group to be more quickly distributed to (from) all of the signal processors of the group. Naturally, each of the signal processors 214x of a group of signal processors in a vector processor 212 may have its own "external" connection by way of a separate sixth input-output port 206, whereupon the group of signal processors in the vector processor 212x would include only the second type of signal processor 214x.

Figure 3:
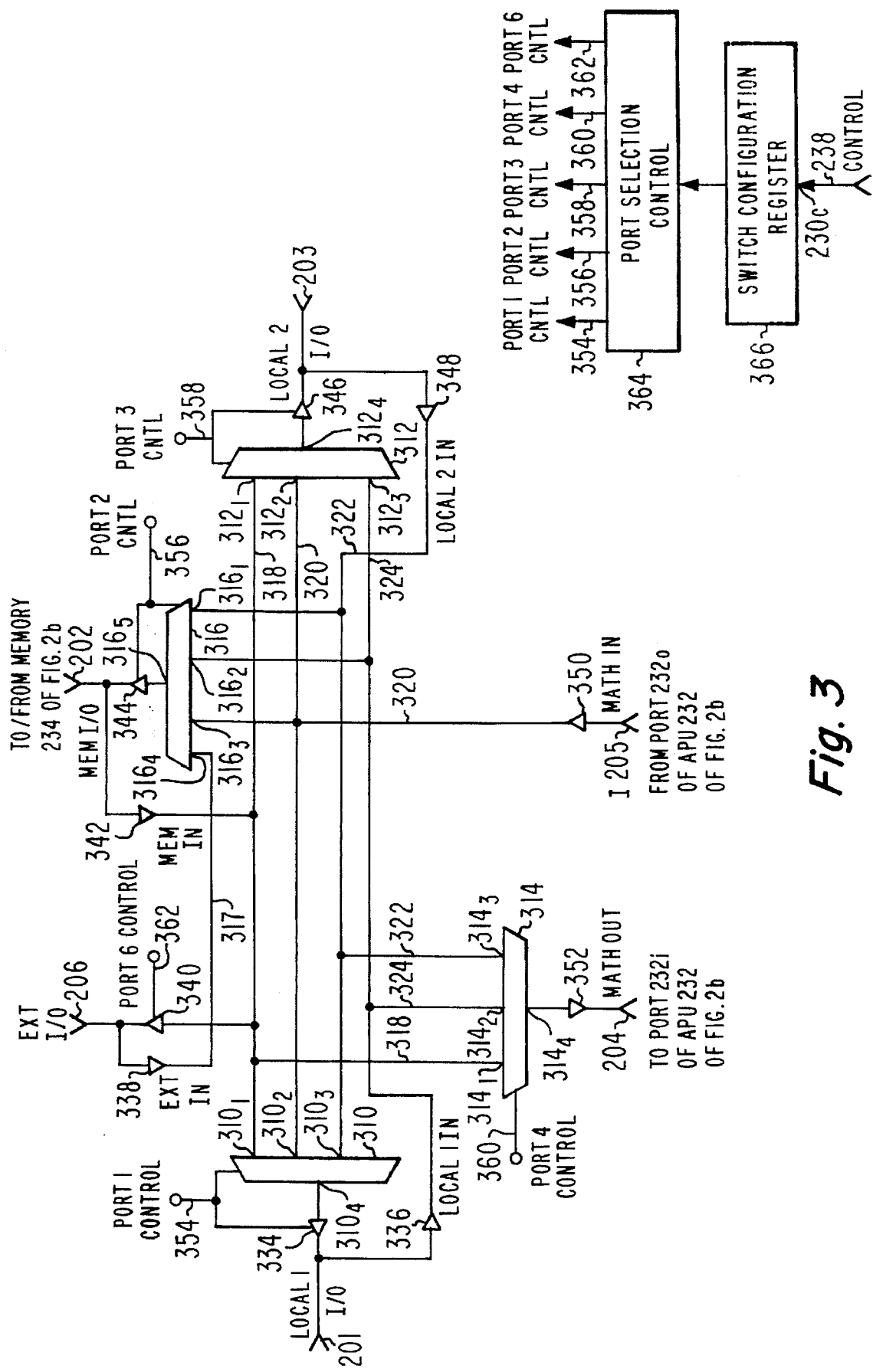
FIG. 3 is a simplified block diagram of a switcher of the signal processor of FIG. 2b, illustrating more details thereof.

FIG. 3 illustrates some details of switcher 230 of FIG. 2b. Elements of FIG. 3 corresponding to those of FIGS. 1, 2a, or 2b are designated by like reference numerals. In FIG. 3, three controllable three-to-one multiplexers 310, 312, and 314 provide for switching of data, in conjunction with a four-to-one multiplexer 316. Three-to-one multiplexer 310 is controlled by a control signal applied by way of a signal path or port 354 from a port selection controller 364. Multiplexer 312 is controlled by a control signal applied over a signal path 358 from port selection controller 364. Similarly, multiplexers 314 and 316 are controlled by control signals applied by way of signal ports or paths 360 and 356, respectively, from port selection controller 364. A port 310$_1$ of multiplexer 310 is connected by a signal path 318 to a corresponding port 312$_1$ of multiplexer 312, to a port 314$_1$ of multiplexer 314, and to the input port of a controlled unidirectional driver 340. A port 310$_2$ of multiplexer 310 is connected by a signal path 320 to a port 312$_2$ of multiplexer 312, to a port 316$_3$ of multiplexer 316, and to an output port of a unidirectional driver 350. A port 310$_3$ of multiplexer 310 is connected by a path 322 to port 314$_3$ of multiplexer 314, to port 316$_1$ of multiplexer 316, and to the output port of a unidirectional driver 348. A port 312$_3$ of multiplexer 312 is connected by a path 324 to port 314$_2$ of multiplexer 314, to a port 316$_2$ of multiplexer 316, and to an output port of a unidirectional driver 336.

The common port 310$_4$ of multiplexer 310 of FIG. 3 is coupled to the input of a controllable unidirectional driver 334, the output of which is coupled to "Local 1" I/O port 201, and the control port of which is coupled for control to signal path 354 for being controlled thereby. Signals applied to I/O port 201 from outside switcher 230 of FIG. 3 are coupled to the input of unidirectional driver 336, and thence to signal path 324. The common port 312$_4$ of multiplexer 312 is coupled to the input of a controllable unidirectional driver 346, the output of which is coupled to "Local 2" I/O port 203, and the control port of which is coupled for control to control path or port 358. Signals applied to Local 2 I/O port 203 from outside switcher 230 of FIG. 3 are coupled to the input of unidirectional driver 348, and thence to signal path 322. The common port 314$_4$ of multiplexer 314 is coupled to the input of a unidirectional driver 352, the output of which is coupled to Math output port 204, for application to the input port of the associated arithmetic processing unit (not illustrated in FIG. 3). Signals arriving at input port 205 from the output port of the associated arithmetic processing unit are applied by way of a unidirectional driver 350 to signal path 320. The common port 316$_5$ of controllable multiplexer 316 is coupled to the input of a controllable unidirectional driver 344, the output of which is coupled to I/O port 202, for coupling signals to associated memory 234 (not illustrated in FIG. 3), and the control port of which is coupled to control signal path 356. Signals arriving at I/O port 202 from the associated memory are coupled to the input of a unidirectional driver 342, and thence to signal path 318. Port 316$_4$ of multiplexer 316 is coupled by a signal path 317 to the output of a unidirectional driver 338, the input port of which is coupled to "external" I/O port 206. A controllable unidirectional driver 340 has its input port coupled to signal path 318, its output port coupled to I/O port 206, and its control port coupled to control port or path 362, for controllably coupling signals from signal path 318 to an external port.

The port selection control table illustrated in FIG. 4 lists the control which must be exerted by the port control signals applied from port selection control block 364 of the switcher 230 of FIG. 3 to the associated multiplexers 310, 312, 314, and 316, and to the drivers 334, 340, 344, and 346. The tabulation of FIG. 4 separately lists two directions of signal flow for each of first, second, fourth and fifth operating modes, and only one direction for the third operating mode. In general, these modes are as follows. In the first mode of operation, first direction, signals are coupled from the Local 1 port to memory by way of the arithmetic processor, and in the first mode, second direction, signals are coupled from the Local 2 port to the memory by way of the arithmetic processor. In the second mode of operation, first direction, the signals are coupled from the Local 1 port to the Local 2 port by way of the arithmetic processor, and in the second mode of operation, second direction, the signals are coupled from the Local 2 to the Local 1 port by way of the arithmetic processor. In the third mode of operation, signals are coupled from memory to the arithmetic processor, and the processed signals are stored in the memory. In the fourth mode of operation, first and second directions, signals are coupled from memory, through the arithmetic processing unit, and to the Local 1 and Local 2 ports, respectively.

In the fifth mode of operation, signals are coupled from the outside to memory in the first direction, and from the memory to the outside in the second direction, both without going through the arithmetic processor.

Referring to FIGS. 2b, 3, and 4, the first mode of operation in direction 1 corresponds to signal flow into Local 1 I/O port 201 of switcher 230, out port 204 to the input of the arithmetic processing unit (not illustrated in FIG. 3), and through input port 205, and out I/O port 202 to the memory (not illustrated in FIG. 3). For purposes of first mode, first direction, the PORT 1 CONTROL signal applied from port selection control block 364 of FIG. 3 to control port 364 disables directional driver 334, as listed in the table of FIG. 4 in the column headed PORT 1 CONTROL, thereby rendering port 1 an input-only port, in which the input signal from port 201 is routed by driver 336 onto path 324, for application to input port $314_2$ of multiplexer 314. This connects the incoming signal to input port $232i$ of arithmetic processor 232 of FIG. 2b. The PORT 2 CONTROL signal applied to control port 356 of FIG. 3 causes multiplexer 316 to select input port $316_3$, which is connected to signal path 320. A PORT 3 CONTROL signal tabulated in FIG. 4 is applied by way of control port 358 to disable driver 346, so no signals can leave I/O port 203. A PORT 4 CONTROL signal is applied by way of control port 360 to multiplexer 314, to cause the multiplexer to couple input port $314_2$ to driver 352, thereby coupling signal from signal path 324 to the input $232i$ of arithmetic processing unit 232. The processed signals from the output port $232o$ of arithmetic processing unit 232 are coupled through input port 205 and driver 350 to signal path 320, and to input port $316_3$ of multiplexer 316. As mentioned above, multiplexer 316 is controlled by the PORT 2 CONTROL signal in the first mode, first direction condition to select signal path 320, which results in coupling the processed signals to the I/O port of memory 234. Thus, in the first mode, first direction, signals enter I/O port 201, exit output port 204 to the arithmetic processor for processing, and the processed signals flow to the memory for storage by way of switcher ports 205 and 202.

The condition for the first mode of operation, second direction, couples signals from Local 2 I/O port 203 of switcher 230 to memory 234 by way of the arithmetic processor. Referring to FIGS. 2b, 3, and 4, the PORT 1 CONTROL for the FIRST MODE, DIRECTION 2, disables driver 334, so that no signals can exit I/O port 201. Port 2 is controlled in accordance with PORT 2 CONTROL of the table of FIG. 4 to "Select 320, Enable 344", which couples the signals on signal path 320 by way of enabled driver 344 and I/O port 202 to memory 234. Local port 2, corresponding to I/O port 203, is controlled in accordance with PORT 3 CONTROL of the table of FIG. 4 to DISABLE 346, which disables output driver 346 associated with port 203, thereby allowing only input signals to be coupled from port 203 onto signal path 322 by way of driver 348 of FIG. 3. The PORT 4 CONTROL applied to control terminal 360 configures multiplexer 314 to couple its input port $314_3$ to its output port $314_4$, which corresponds to selection of signal path 322, as indicated in the table of FIG. 4. Signals from signal path 322 are therefore coupled by way of port 204 to the input port of arithmetic signal processor 232. The processed signals are coupled from output port $232o$ to input port 205, and thence to path 320, which has been selected by multiplexer 316 for this operating mode. In this FIRST MODE, DIRECTION 2 operating mode, external I/O port 206 is disabled by disabling driver 340, as listed in the table in the column headed PORT 6 CONTROL. Thus, in the first mode, signals are coupled from one of Local 1 or Local 2 ports to the memory.

As mentioned above, in the second mode of operation, first direction, the signals are coupled from the Local 1 port of the switcher 230 of FIG. 3 to the Local 2 port by way of the arithmetic processor. The particular control conditions are set forth in the SECOND MODE, FIRST DIRECTION row of the table of FIG. 4. As listed therein, Local 1 port 201 driver 334 is disabled, because signals do not leave Local 1 port 201 in this mode of operation. Instead, signals arriving at the port are coupled by driver 336 to signal path 324. As indicated in the PORT 4 CONTROL column, the control signal applied to control port 360 conditions multiplexer 314 to select path 324, i.e. to couple its input port $314_2$ to its output port, which couples signals to the input port of the arithmetic processor. Processed signals are applied by way of input port 205 to signal path 320 of FIG. 3. As listed in the PORT 3 CONTROL column of FIG. 4, signal path 320 is selected by connecting input port $312_2$ of multiplexer to its output, and driver 346 is enabled to allow the processed signal to exit Local 2. Drivers 344 and 340 are disabled, to thereby prevent signals from leaving ports 202 and 206, as indicated by the DISABLE 340 and DISABLE 344 appearing in the PORT 6 CONTROL and PORT 2 CONTROL columns, respectively, of the table of FIG. 4.

In the second mode of operation, second direction, signals are coupled from the Local 2 to the Local 1 port by way of the arithmetic processor. The particular control conditions are set forth in the SECOND MODE, SECOND DIRECTION row of the table of FIG. 4. As listed therein, Local 2 port 203 driver 346 is disabled, because signals do not leave Local 2 port 203 in this mode of operation. Instead, signals arriving at port 203 are coupled by driver 348 to signal path 322. As indicated in the PORT 4 CONTROL column, the control signal applied to control port 360 conditions multiplexer 314 to select signal path 322, i.e. to couple its input port $314_3$ to its output port, which couples signals to the input port of the arithmetic processor. Processed signals are applied by way of input port 205 to signal path 320 of FIG. 3. As listed in the PORT 1 CONTROL column of FIG. 4, signal path 320 is selected by connecting input port $310_2$ of multiplexer 310 to its output, and driver 334 is enabled to allow the processed signal to exit Local 1 port 201. Drivers 344 and 340 are disabled, to thereby prevent signals from leaving ports 202 and 206, as indicated by the DISABLE 340 and DISABLE 344 appearing in the PORT 6 CONTROL and PORT 2 CONTROL columns, respectively, of the table of FIG. 4.

In the third mode of operation, signals are coupled from memory to the arithmetic processor, and the processed signals are returned to the memory. This mode of operation has only one direction, and its conditions are tabulated in the THIRD MODE row of the table of FIG. 4. In the third mode of operation, driver 344 is enabled, as noted in the PORT 2 CONTROL column, and signal path 320 is selected by control signals applied to multiplexer 316 by way of control terminal 356. This allows data read from memory 234 to be coupled by driver 342 to signal path 318, and for processed data on signal path 320 to be coupled back to the memory. The PORT 4 CONTROL column of FIG. 4 indicates that signal path 318 is selected by multiplexer 314 in response to control signals applied to control port 360, which couples the signals read from memory to the input port of arithmetic signal processor 232. The resulting processed signals are applied from arithmetic signal processor 232 to signal path 320 by way of input port 205, whereby they are coupled to the memory. Other signal paths are closed off in the third operating mode, as indicated by "DISABLE 334" in the PORT 1 CONTROL column, by "DISABLE 346" in the PORT 3 CONTROL column, and the "DISABLE 340" in the PORT 6 CONTROL column.

In the fourth mode of operation, first and second directions, signals are coupled from memory, through the arithmetic processing unit, and to the Local 1 and Local 2 ports, respectively. The control conditions for the fourth mode of operation, first direction, are listed in the row of FIG. 4 denominated FOURTH MODE DIRECTION 1. In the fourth mode, first direction, PORT 2 CONTROL is DISABLE 344, which disables driver 344, preventing data from being applied to memory 234, but allowing data read from memory 234 to be coupled to signal path 318 of FIG. 3 by way of driver 342. The PORT 4 CONTROL is SELECT 318, thereby applying a control signal to control port 360 for causing multiplexer 314 to couple its input port $314_1$ to its output, thereby selecting signal path 318 to be coupled to the input port of arithmetic processor 232 of FIG. 2b. Thus, the signal read from memory is coupled to the input of the arithmetic processor 232 by way of signal path 318 and multiplexer 314. The processed signals produced by arithmetic signal processor 232 are coupled by way of input port 205 of FIG. 3 to signal path 320. As indicated in the PORT 1 CONTROL column of FIG. 4, the port 1 control signal applied to control port 354 for the FOURTH MODE DIRECTION 1 is SELECT 320, ENABLE 344, which sets multiplexer 310 to select its $310_2$ input port and thereby couple signal path 320 to driver 334, and to enable driver 334 to couple the signals out from the Local 1 port. In this fourth mode of operation, the port 3 control signal applied to control port 358 is specified as DISABLE 346, for disabling driver 346, and preventing outputs from the Local 2 port. Similarly, driver 340 of external port 206, if used, receives a DISABLE 340 control signal.

In the FOURTH MODE, SECOND DIRECTIOIN, signals read from memory are coupled by way of the arithmetic signal processor to Local 2 port 203. For this purpose, referring to FIGS. 3 and 4, Local 1 port 201 is disabled by the DISABLE 334 control signal applied to control port 354; memory port 202 is enabled for reading, but disabled for writing, by the DISABLE 344 control signal applied to control port 356; Local 2 port 203 is enabled for outputting processed signal from signal path 320 by the SELECT 320, ENABLE 346 control signal applied to control port 358; Math out port 204 is always enabled, and it is coupled to signal path 318 by the SELECT 318 control signal applied to control input port 360. The processed signals from the output of the arithmetic processing unit is applied by way of input port 205 to signal path 320, and becomes available to multiplexer 312. Lastly, external port 206 is disabled by the DISABLE 340 control signal applied to control port 362.

In the fifth mode of operation, signals are coupled from the outside the signal processor 214x to memory within the signal processor 214x in the first direction, and from the memory to the outside in the second direction, both without going through the arithmetic processor 232 of signal processor 214x. Referring to FIG. 3, and to the FIFTH MODE, DIRECTION 1 row of FIG. 4, the PORT 2 CONTROL signal applied to control port 356 is "SELECT 317, ENABLE 344", to thereby enable driver 344 and multiplexer 316 to couple signals from signal path 317 to memory. The PORT 6 CONTROL signal applied to control port 362 is DISABLE 340, which disables output driver 340, but which does not disable input driver 338. Input driver 338 can couple signals directly to input port $316_4$ of multiplexer 316 by way of signal path 317. The drivers 334 of port 201 and 346 of port 203 are disabled by the DISABLE 334 and DISABLE 346 control signals applied to control ports 354 and 358, respectively. The condition of multiplexer 314 is irrelevant.

In the fifth mode, direction 2, signals are coupled from memory port 202 of FIG. 3 to external port 206. Referring to FIG. 3 and the FIFTH MODE DIRECTION 2 row of FIG. 4, the control signal applied to control port 356 is DISABLE 344, which disables the write-direction driver coupled to memory, but allows data read from memory to pass through driver 342 to signal path 318. The PORT 6 CONTROL signal applied to control port 362 is ENABLE 340, thereby enabling driver 340 to couple signals from signal path 318 to an external or system port. The Local 1 port 201 and Local 2 port 203 are disabled for outputs by the DISABLE 344 and DISABLE 340 control signals applied to control ports 354 and 358, respectively. The condition of multiplexer 314 is irrelevant for the fifth mode, second direction.

Figure 5:
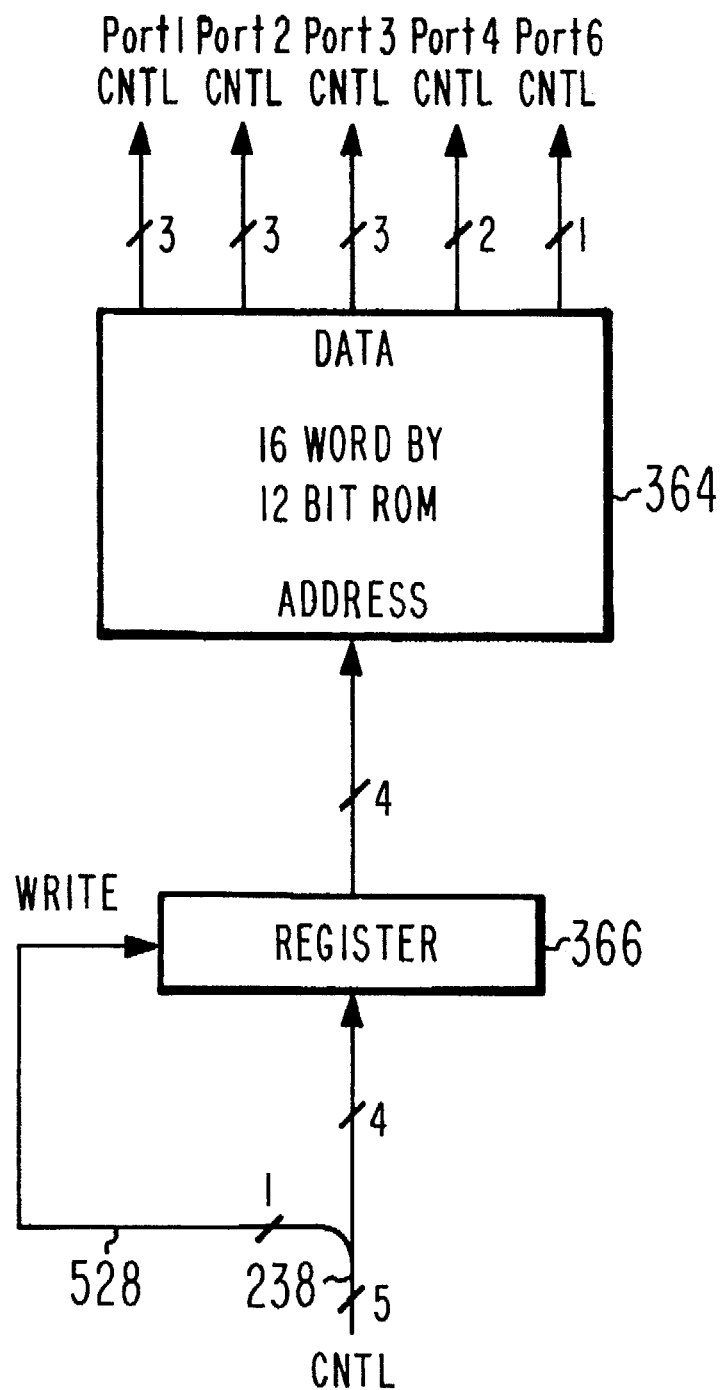
FIG. 5 is a simplified block diagram of a controller which may be used in the arrangement of FIG. 3.

FIG. 5 is a simplified block diagram of port selection control block 364 and switch configuration register 366 of FIG. 3. The illustrated arrangement is assumed to have five modes of operation, with two directions, as tabulated in FIG. 4. Consequently, while three bits would be minimally sufficient to allow identification of the desired mode and direction, the use of four bits, three bits (eight possible states) to identify one of the five modes, and one bit to identify the direction of signal flow, is somewhat simpler to explain. In FIG. 5, mode and direction control signals are applied in parallel over four bits of the five-bit control signal path 238 to data input ports of register 366, and a clock (CLK) or WRITE bit is applied over another bit path 538 to the WRITE input port of register 366. Register 366 receives the mode and direction signals originating from control computer 28 of FIG. 1, and stores them during the CLK pulse. Thereafter, until the next CLK pulse stores some other operating mode, the current operating mode command remains available at the output of register 366.

The four-bit mode and direction signal stored by register 366 is made available over a four-bit signal path to the address input port of a sixteen-word by twelve-bit memory or ROM 364. The four-bit addresses identify the one of the stored twelve-bit words of ROM 364 which is to be accessed. Each twelve-bit word is preprogrammed to a value which sets the corresponding port hardware to the appropriate state. In the first mode, first direction, for example, the input command applied over data path 238 may be 0010, representing address 001, and direction 0. ROM 364 has twelve bits stored at location 001, namely three bits for control of each of port control 1, 2, 3, and 4, and one bit for control of port control 6. More particularly, the three bits for control of port 1 in mode 1 are: one bit (0) for control of driver 334 of FIG. 3 to the OFF state; two bits (01) for setting the state of multiplexer 310 to couple port $310_1$ to the input of driver 334. However, since the current state of the driver is OFF, no signal is coupled by that multiplexer path. The next three bits of the twelve bits produced by ROM 364 of FIG. 5 in response to the 0010 command are routed to port 2 control, and include one bit (1) to enable driver 344 to the ON state, and two bits (11) to set multiplexer 316 to couple its port $316_3$ to its output port $315_5$. The next three bits of the twelve bits produced by ROM 364 of FIG. 5 in response to the 0010 command are routed to port 3 control, and include one bit (0) to disable driver 346 of FIG. 3, and two bits (01) to set multiplexer 312 to couple its port $312_1$ to its common port $312_4$. The next two bits (10) of the twelve bits produced by ROM 364 of FIG. 5 in response to the 0010 command are routed to port 32 control, to set multiplexer 314 to couple its port $314_2$ to its output port $314_4$. The last bit of the twelve bits produced by ROM 364 of FIG. 5 in the first mode, first direction is logic state 0, used to disable driver 340 of FIG. 3. Thus, the twelve-bit word 001111001100 is produced at the output of ROM 364 in response to the command 0010. With this explanation of the first mode, first direction, reference to the table of FIG. 4 should make the other stored commands obvious.

Thus, the invention may be summarized as a digital signal processor (212a, 212b, ... 212p, ...) configurable for either serial or parallel operation on source data from a source I/O port (101), for performing digital signal processing to produce processed signals, and for coupling the processed signals to the source I/O port (101), the digital signal processor including:

a plurality of first signal processors (214a), each of the first signal processors (214a) including;

(a) memory (234) including at least a data input-output port (235), for temporarily storing data applied to the input-output port (235) of the memory (234), and for reading stored data to the input-output port (235) of the memory (234);

(b) an arithmetic processor (232) including at least a data input port (232i), a data output port (232o), and a control port (232c), for performing mathematical processes on input data under the control of commands applied to the control port (232c), and for generating processed data at the output port (232o) of the arithmetic processor (232);

(c) a switcher (230) including at least a command input port (230c) and first (201), second (202), and third (203) bidirectional input-output ports, a fourth output-only port (204), and a fifth (205) input-only port, the second input-output port (202) being coupled to the data port (235) of the memory (234), the fourth output port (204) and the fifth input port (205) being coupled to the input (232i) and output (232o) ports, respectively, of the arithmetic processor (232), for, in a first mode of operation, coupling signals from the first input-output port (201) of the switcher (230) to the fourth output port (204) of the switcher (230), for thereby coupling signals between the first input-output port (201) of the switcher (230) and the input port (232i) of the arithmetic processor (232), and coupling signals from the fifth input port (205) of the switcher (230) to the second input-output port (202) of the switcher (230), for thereby coupling signals from the arithmetic processor (232) to the memory (234), for, in a second mode of operation, coupling signals from the first input-output port (201) of the switcher (230) to the fourth output port (204) of the switcher (230), for thereby coupling signals from the first input-output port (201) of the switcher (230) to the input port (232i) of the arithmetic processor (232), and for coupling signals from the fifth input port (205) of the switcher (230) to the third input-output port (203) of the switcher (230), thereby coupling signals from the output port (232o) of the arithmetic processor (232) to the third input-output port (203) of the switcher (230), for, in a third mode of operation, coupling signals from the second input-output port (202) of the switcher (230) to the fourth output port (204) of the switcher (230), and from the fifth input port (205) of the switcher (230) to the second input-output port (202) of the switcher (230), thereby coupling signals from the memory (234) to the input port (232i) of the arithmetic processor (232), and from the output port (232o) of the arithmetic processor (232) to the memory (234), for, in a fourth mode of operation, coupling signals from the second input-output port (202) of the switcher (230) to the fourth output port (204) of the switcher (230), thereby coupling the memory (234) to the input port (232i) of the arithmetic processor (232), and for coupling the fifth input port (205) of the switcher (230) to the third input-output port (203) of the switcher (230), thereby coupling the output port (232o) of the arithmetic processor (232) to the third input-output port (203) of the switcher (230);

a plurality of second signal processors (214b), each of the second signal processors (214b) including;

(a) memory (234) including at least a data input-output port (235), for temporarily storing data applied to the input-output port (235) of the memory (234), and for reading stored data to the input-output port (235) of the memory (234);

(b) an arithmetic processor (232) including at least a data input port (232i), a data output port (232o), and a control port (232c), for performing mathematical processes on input data under the control of commands applied to the control port (232c) of the arithmetic processor (232), and for generating processed data at the output port (232o) of the arithmetic processor (232);

(c) a switcher (230) including at least a command input port (230c) and first (201), second (202), and third (203) bidirectional input-output ports, a fourth output-only port (204), a fifth input-only port (205), and a sixth input-output port (206), the second input-output port (202) being coupled to the data port (235) of the memory (234), the fourth output port (204) and the fifth input port (205) being coupled to the input (232i) and output (232o) ports, respectively, of the arithmetic processor (232), for, in a first mode of operation, coupling signals from the first input-output port (201) of the switcher (230) to the fourth output port (204) of the switcher (230), for thereby coupling signals between the first input-output port (201) of the switcher (230) and the input port (232i) of the arithmetic processor (232), and coupling signals from the fifth input port (205) of the switcher (230) to the second input-output port (202) of the switcher (230), for thereby coupling signals from the arithmetic processor (232) to the memory (234), for, in a second mode of operation, coupling signals from the first input-output port (201) of the switcher (230) to the fourth output port (204) of the switcher (230), for thereby coupling signals from the first input-output port (201) of the switcher (230) to the input port (232i) of the arithmetic processor (232), and for coupling signals from the fifth input port (205) of the switcher (230) to the third input-output port (203) of the switcher (230), thereby coupling signals from the output port (232o) of the arithmetic processor (232) to the third input-output port (203) of the switcher (230), for, in a third mode of operation, coupling signals from the second input-output port (202) of the switcher (230) to the fourth output port (204) of the switcher (230), and from the fifth input port (205) of the switcher (230) to the second input-output port (202) of the switcher (230), thereby coupling signals from the memory (234) to the input port (232i) of the arithmetic processor (232), and from the output port (232o) of the arithmetic processor (232) to the memory (234), for, in a fourth mode of operation, coupling signals from the second input-output port (202) of switcher (230) to the fourth output port (204) of the switcher (230), thereby coupling the memory (234) to the input port (232i) of the arithmetic processor (232), and for coupling signals from the fifth input port (205) of the switcher (230) to the third input-output port (203) of the switcher (230), thereby coupling the output port (232o) of the arithmetic processor (232) to the third input-output port (203) of the switcher (230);

for, in a fifth mode of operation, coupling signals between the sixth input-output port (206) of the switcher (230) and the second input-output port (202) of the switcher (230), for thereby transducing signals between the memory (234) and the sixth input-output port (206);

a group local interconnection arrangement (218) for coupling together the signal processors (214) of a group (212) of the signal processors (214), each the groups of signal processors (214) including a plurality of the first signal processors (214a) and at least one of the second signal processors (214b), the group local interconnection arrangement (218) connecting the first input-output port (201) of each of the signal processors (214) of the group (212) to the third input-output port (203) of another signal processor (214) of the group (212), whereby the signal processors (214) of each of the groups are coupled in a ring;

a system interconnection arrangement (105) coupled to the source I/O port (101) and to the sixth input-output ports (206) of the second signal processors (214b) of each of the groups (212) of signal processors (214);

a plurality of group control arrangements (216), each of which is associated with one of the groups (212) of signal processors (214), each of the group control arrangements (216) being coupled to the control input port (232i) of the arithmetic processor (232) and to the switcher (230) of each of the signal processors (214) of the associated group (212) of the signal processors (214), for selecting, for each one of the switchers (230) of the signal processors (214), at least one of the first, second, third, and fourth modes of operation in the case of the first signal processors (214a), and one of the first, second, third, fourth, and fifth modes of operation in the case of the second signal processor (214b), independently of the mode of operation selected for any others of the switchers (230) of the signal processors (214), and for selecting the mathematical operations to be performed by each of the arithmetic processors (232) of the signal processors (214), independently of the mathematical operations selected to be performed for any others of the arithmetic processors (232) of the signal processors (214), all under the control of stored instructions associated with the group control arrangements (216), which stored instructions are selected by command external to the group control arrangements, the stored instructions causing the group control arrangements to (a) when data is to coupled between the source I/O port (101) and the memory (234) of a second signal processor (214b) of the group, select the fifth mode of operation;

(b) in a serial processing mode, select the fourth mode of operation for at least one of the second signal processors (214b), and the second mode of operation for at least one of the first signal processors (214a) next adjacent to the second signal processor (214b) in the ring, and the fourth mode of operation for at least one of the first signal processors (214a) more remote from the second signal processor (214b) than the next adjacent first signal processor (214a);

(c) in a parallel processing mode, select the third mode of operation for all the first (214a) and second (214b) signal processors.

Control signals from group control unit 216 of FIG. 2a are applied over a signal path 238 of FIG. 3 to a control signal register 366, which temporarily stores the control signal or command, and applies it to a port selection control block, which is a memory or decoder which decodes the command into a plurality of control signals on control signal paths 354, 356, 358, 360, and 362, depending upon the commanded mode or modes of operation.

The described invention has the salient advantage, in addition to the advantage of ready conversion between serial and parallel processing, that memory bandwidth is conserved. More particularly, it allows a reduction in the total memory storage in the entire system, by comparison with a system of standard or dedicated parallel processors, because the system may be partially reconfigured to serial pipelining.

Other embodiments of the invention will be apparent to those skilled in the art. For example, while the description of the invention is couched in terms of a digital signal processor for a radar system, a digital signal processor according to the invention may find use in any processing environment equivalent to that of a radar system, which is to say, an environment in which many different types of computations must be performed, some of which are faster when parallel processors are used, and others of which are faster when pipelined processors are used. While unidirectional drivers 334, 344, and 346 of FIG. 3 are illustrated as being coupled for control to the same signal path 354, 356, and 358 which controls the associated multiplexers, the control signals for the multiplexers may be different from the control signals for the drivers, and may be coupled over mutually different portions of signal paths 354, 356, and 358. More generally, the signal paths in the arrangement according to the invention may be connected for serial bit streams, parallel bit streams, or even combinations of both. In the third operating mode described in conjunction with FIGS. 2b, 3, and 4, the memory 234 must be read essentially simultaneously with writing; in practice, this may require that memory 234 as illustrated in FIG. 2b actually be in the form of a plurality of separate memories, operable separately for reading and writing, as suggested in FIG. 2a. Similarly, control of arithmetic processor 232 of FIG. 2b may require division of the processor into two different portions, also as suggested in FIG. 2a.

What is claimed is:

1. An apparatus for processing signals in serial pipeline fashion or in parallel fashion through a plurality of processors, said apparatus comprising:

first, second and third processors, each including an input port and an output port, for processing signals;

first, second and third memories, for temporarily storing and retrieving data;

first, second and third switching means coupled to said first, second and third processors, respectively, and to said first, second and third memories, respectively, each of said first, second and third switching means including local 1 and local 2 input/output ports, at least one of said first, second and third switching means including an external connection input-output port, said first switching means being for, in a first direction in a first mode of operation, coupling signals from said local 1 port of said first switching means to said input port of said first processing means, and from said output port of said first processing means to said first memory means;

for, in a second direction in a first mode of operation, coupling signals from said local 2 port to said input port of said first processing means, and from said output port of said first processing means to said local 1 port;

for, in a first direction in a second mode of operation, coupling signals from said local 1 port of said first switching means to said input port of said first processing means, and from said output port of said first processing means to said local 2 port of said first switching means;

for, in a second direction in said second mode of operation, coupling signals from said local 2 port of said first switching means to said input port of said first processing means, and from said output port of said first processing means to said local 1 port of said first switching means;

for, in a third mode of operation, for coupling signals from said first memory means to said input port of said first processing means, and from said output port of said first processing means to said first memory means;

for, in a first direction of a fourth mode of operation, coupling signals from said first memory means to said input port of said first processing means, and from said output port of said first processing means to said local 1 port of said first switching means;

for, in a second direction of a fourth mode of operation, coupling signals from said first memory means to said input port of said first processing means, and from said output port of said first processing means to said local 2 port of said first switching means;

for, in a first direction of a fifth mode of operation, coupling signals from said external connection port of said first switching means, if such a port exists, to said first memory means; and for, in a second direction of said fifth mode of operation, coupling signals to said external connection port of said first switching means, if such a port exists, from said first memory means;

said second switching means being for, in a first direction in a first mode of operation, coupling signals from said local 1 port of said second switching means to said input port of said second processing means, and from said output port of said second processing means to said second memory means;

for, in a second direction in said first mode of operation, coupling signals from said local 2 port of said second switching means to said input port of said second processing means, and from said output port of said second processing means to said local 1 port of said second switching means;

for, in a first direction in a second mode of operation, coupling signals from said local 1 port of said second switching means to said input port of said second processing means, and from said output port of said second processing means to said local 2 port of said second switching means;

for, in a second direction in said second mode of operation, coupling signals from said local 2 port of said second switching means to said input port of said second processing means, and from said output port of said second processing means to said local 1 port of said second switching means;

for, in a third mode of operation, coupling signals from said second memory means to said input port of said second processing means, and from said output port of said second processing means to said second memory means;

for, in a first direction of a fourth mode of operation, coupling signals from said second memory means to said input port of said second processing means, and from said output port of said second processing means to said local 1 port of said second switching means;

for, in a second direction of a fourth mode of operation, coupling signals from said second memory means to said input port of said second processing means, and from said output port of said second processing means to said local 2 port of said second switching means;

for, in a first direction of a fifth mode of operation, coupling signals from said external connection port of said second switching means, if such a port exists, to said second memory means; and for, in a second direction of said fifth mode of operation, coupling signals to said external connection port of said second switching means, if such a port exists, from said second memory means;

said third switching means being for, in a first direction in a first mode of operation, coupling signals from said local 1 port of said third switching means to said input port of said third processing means, and from said output port of said third processing means to said third memory means;

for, in a second direction in said first mode of operation, coupling signals from said local 2 port of said third switching means to said input port of said third processing means, and from said output port of said third processing means to said local 1 port of said third switching means;

for, in a first direction in a second mode of operation, coupling signals from said local 1 port of said third switching means to said input port of said third processing means, and from said output port of said third processing means to said local 2 port of said third switching means;

for, in a second direction in said second mode of operation, coupling signals from said local 2 port of said third switching means to said input port of said third processing means, and from said output port of said third processing means to said local 1 port of said third switching means;

for, in a third mode of operation, coupling signals from said third memory means to said input port of said third processing means, and from said output port of said third processing means to said third memory means;

for, in a first direction of a fourth mode of operation, coupling signals from said third memory means to said input port of said third processing means, and from said output port of said third processing means to said local 1 port of said third switching means;

for, in a second direction of a fourth mode of operation, coupling signals from said third memory means to said input port of said third processing means, and from said output port of said third processing means to said local 2 port of said third switching means;

for, in a first direction of a fifth mode of operation, coupling signals from said external connection port of said third switching means, if such a port exists, to said third memory means; and for, in a second direction of said fifth mode of operation, coupling signals to said external connection port of said third switching means, if such a port exists, from said third memory means;

interconnection means coupled to said local 1 and local 2 input/output ports of said first, second, and third switching means, for coupling said local 2 input/output port of said first switching means to said local 1 input/output port of said second switching means, for coupling said local 2 input/output port of said second switching means to said local 1 input/output port of said third switching means, and for coupling said local 2 input/output port of said third switching means to said local 1 input/output port of said first switching means.

2. A digital signal processor configurable for either serial or parallel operation on source data from a source I/O port, for performing digital signal processing to produce processed signals, and for coupling said processed signals to said source I/O port, said digital signal processor comprising:

a plurality of first signal processing means, each of said first signal processing means including;

(a) memory means including at least a data input-output port, for temporarily storing data applied to said input-output port of said memory means, and for reading stored data to said input-output port of said memory means;

(b) arithmetic processing means including at least a data input port, a data output port, and a control port, for performing mathematical processes on input data under the control of commands applied to said control port, and for generating processed data at said output port of said arithmetic processing means;

(c) switching means including at least a command input port and first, second, and third bidirectional input-output ports, a fourth output-only port, and a fifth input-only port, said second input-output port being coupled to said data port of said memory means, said fourth output port and said fifth input port being coupled to said input and output ports, respectively, of said arithmetic processing means, for, in a first mode of operation, coupling signals from said first input-output port of said switching means to said fourth output port of said switching means, for thereby coupling signals between said first input-output port of said switching means and said arithmetic processing means, and coupling signals from said fifth input port of said switching means to said second input-output port of said switching means, for thereby coupling signals from said arithmetic processing means to said memory means, for, in a second mode of operation, coupling signals from said first input-output port of said switching means to said fourth output port of said switching means, for thereby coupling signals from said first input-output port of said switching means to said input port of said arithmetic processing means, and for coupling signals from said fifth input port of said switching means to said third input-output port of said switching means, thereby coupling signals from said output port of said arithmetic processing means to said third input-output port of said switching means, for, in a third mode of operation, coupling signals from said second input-output port of said switching means to said fourth output port of said switching means, and from said fifth input port of said switching means to said second input-output port of said switching means, thereby coupling signals from said memory means to said input port of said arithmetic processing means, and from said output port of said arithmetic processing means to said memory means, for, in a fourth mode of operation, coupling signals from said second input-output port of said switching means to said fourth output port of said switching means, thereby coupling said memory means to said input port of said arithmetic processing means, and for coupling said fifth input port of said switching means to said third input-output port of said switching means, thereby coupling said output port of said arithmetic processing means to said third input-output port of said switching means;

a plurality of second signal processing means, each of said second signal processing means including;

(a) memory means including at least a data input-output port, for temporarily storing data applied to said input-output port of said memory means, and for reading stored data to said input-output port of said memory means;

(b) arithmetic processing means including at least a data input port, a data output port, and a control port, for performing mathematical processes on input data under the control of commands applied to said control port of said arithmetic processing means, and for generating processed data at said output port of said arithmetic processing means;

(c) switching means including at least a command input port and first, second, and third bidirectional input-output ports, a fourth output-only port, a fifth input-only port, and a sixth input-output port, said second input-output port being coupled to said data port of said memory means, said fourth output port and said fifth input port being coupled to said input and output ports, respectively, of said arithmetic processing means, for, in a first mode of operation, coupling signals from said first input-output port of said switching means to said fourth output port of said switching means, for thereby coupling signals between said first input-output port of said switching means and said input port of said arithmetic processing means, and coupling signals from said fifth input port of said switching means to said second input-output port of said switching means, for thereby coupling signals from said arithmetic processing means to said memory means, for, in a second mode of operation, coupling signals from said first input-output port of said switching means to said fourth output port of said switching means, for thereby coupling signals from said first input-output port of said switching means to said input port of said arithmetic processing means, and for coupling signals from said fifth input port of said switching means to said third input-output port of said switching means, thereby coupling signals from said output port of said arithmetic processing means to said third input-output port of said switching means, for, in a third mode of operation, coupling signals from said second input-output port of said switching means to said fourth output port of said switching means, and from said fifth input port of said switching means to said second input-output port of said switching means, thereby coupling signals from said memory means to said input port of said arithmetic processing means, and from said output port of said arithmetic processing means to said memory means, for, in a fourth mode of operation, coupling signals from said second input-output port of said switching means to said fourth output port of said switching means, thereby coupling said memory means to said input port of said arithmetic processing means, and for coupling signals from said fifth input port of said switching means to said third input-output port of said switching means, thereby coupling said output port of said arithmetic processing means to said third input-output port of said switching means;

for, in a fifth mode of operation, coupling signals between said sixth input-output port of said switching means and said second input-output port of said switching means, for thereby transducing signals between said memory means and said sixth input-output port;

group local interconnection means for coupling together the signal processing means of a group of said signal processing means, each said group of signal processing means including a plurality of said first signal processing means and at least one of said second signal processing means, said group local interconnection means connecting said first input-output port of each of said signal processing means of said group to said third input-output port of another signal processing means of said group, whereby said signal processing means of each of said groups are coupled in a ring;

system interconnection means coupled to said source I/O port and to said sixth input-output ports of said second signal processing means of each of said groups of signal processing means;

a plurality of group control means, each of which is associated with one of said groups of signal processing means, each of said group control means being coupled to said control input port of said arithmetic processing means and to said control input port of said switching means of each of said signal processing means of the associated group of said signal processing means, for selecting, for each one of said switching means of said signal processing means, at least one of said first, second, third, and fourth modes of operation in the case of said first signal processing means, and one of said first, second, third, fourth, and fifth modes of operation in the case of said second signal processing means, independently of the mode of operation selected for any other of said switching means of said signal processing means, and for selecting the mathematical operations to be performed by each of said arithmetic processing means of said signal processing means, independently of the mathematical operations selected to be performed for any others of said arithmetic processing means of said signal processing means, all under the control of stored instructions associated with said group control means, which stored instructions are selected by command external to said group control means, said stored instructions causing said group control means to (a) when data is to coupled between said source I/O port and said memory of a second signal processing means of said group, select said fifth mode of operation;

(b) in a serial processing mode, select said fourth mode of operation for at least one of said second signal processing means, and said second mode of operation for at least one of said first signal processing means next adjacent to said second signal processing means in said ring, and said fourth mode of operation for at least one of said first signal processing means more remote from said second signal processing means than said next adjacent first signal processing means;

(c) in a parallel processing mode, select said third mode of operation for all said first and second signal processing means.

3. A processor according to claim 2, wherein each of said groups of signal processing means includes six signal processing means.

* * * * *